April 1, 1958 D. W. GINNS 2,828,875
REMOTE HANDLING ARRANGEMENTS
Filed Nov. 25, 1955 9 Sheets-Sheet 1

INVENTOR
DENNIS W. GINNS
ATTORNEYS

April 1, 1958          D. W. GINNS          2,828,875

REMOTE HANDLING ARRANGEMENTS

Filed Nov. 25, 1955          9 Sheets-Sheet 3

INVENTOR
DENNIS W. GINNS

ATTORNEYS

April 1, 1958     D. W. GINNS     2,828,875
REMOTE HANDLING ARRANGEMENTS
Filed Nov. 25, 1955     9 Sheets-Sheet 4

INVENTOR
DENNIS W. GINNS

ATTORNEYS.

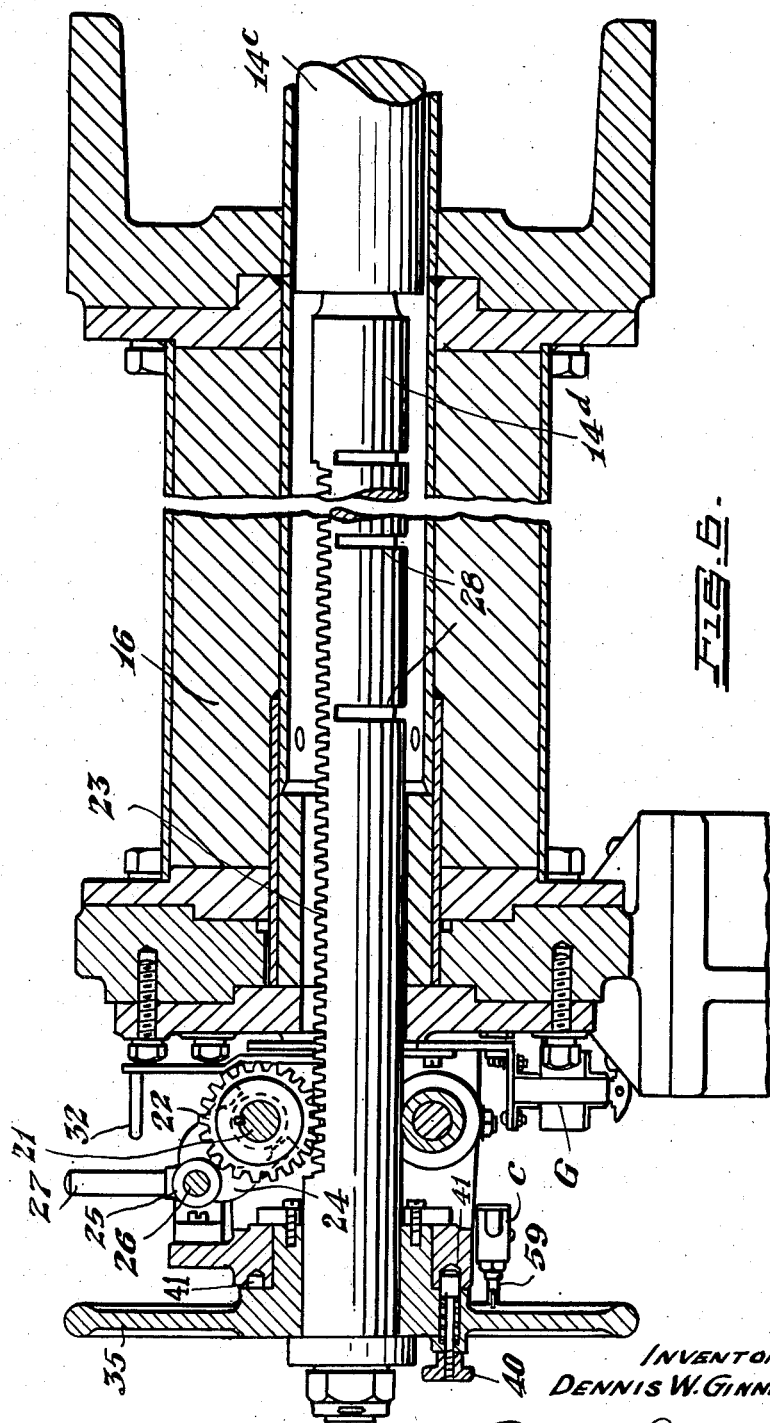

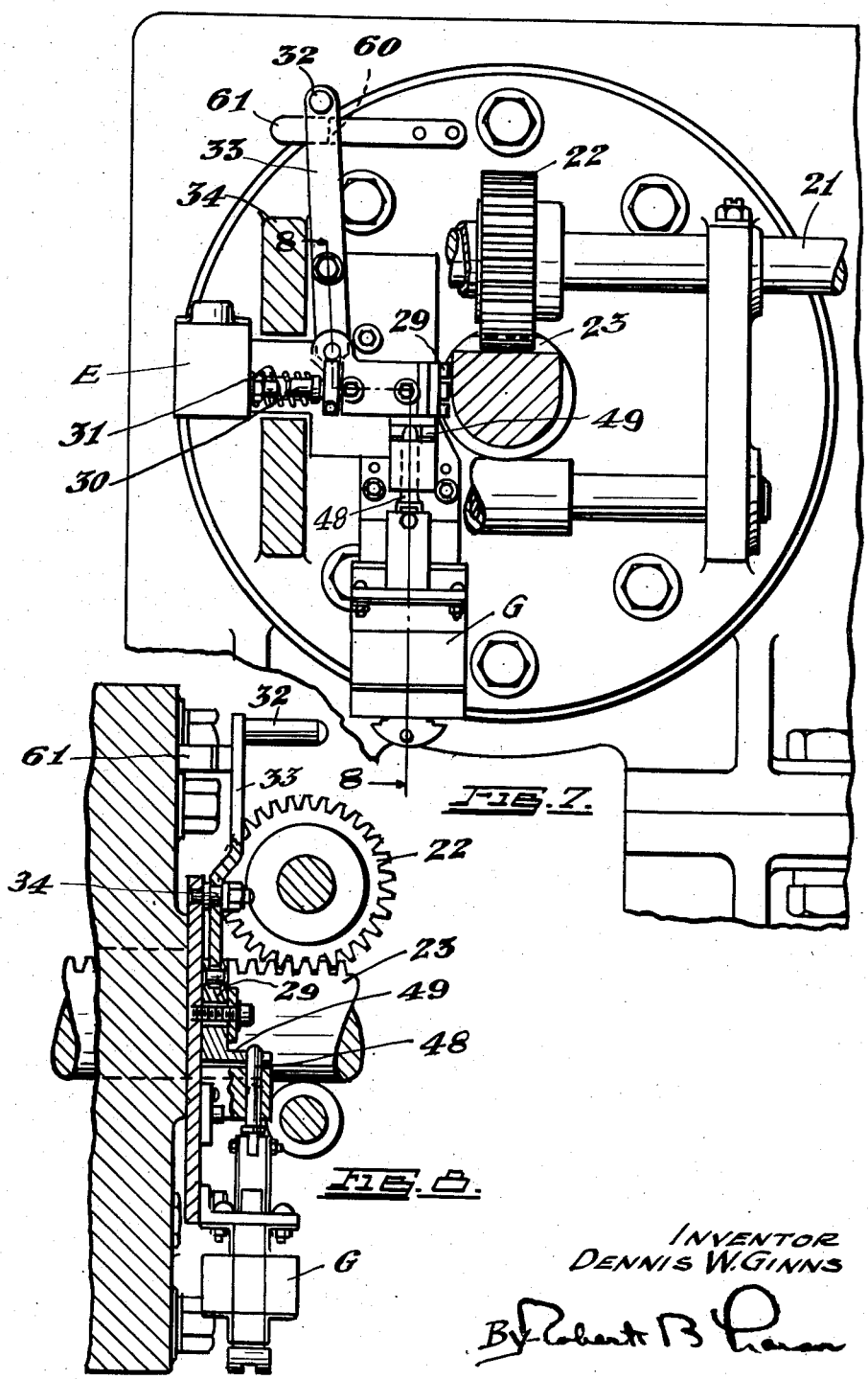

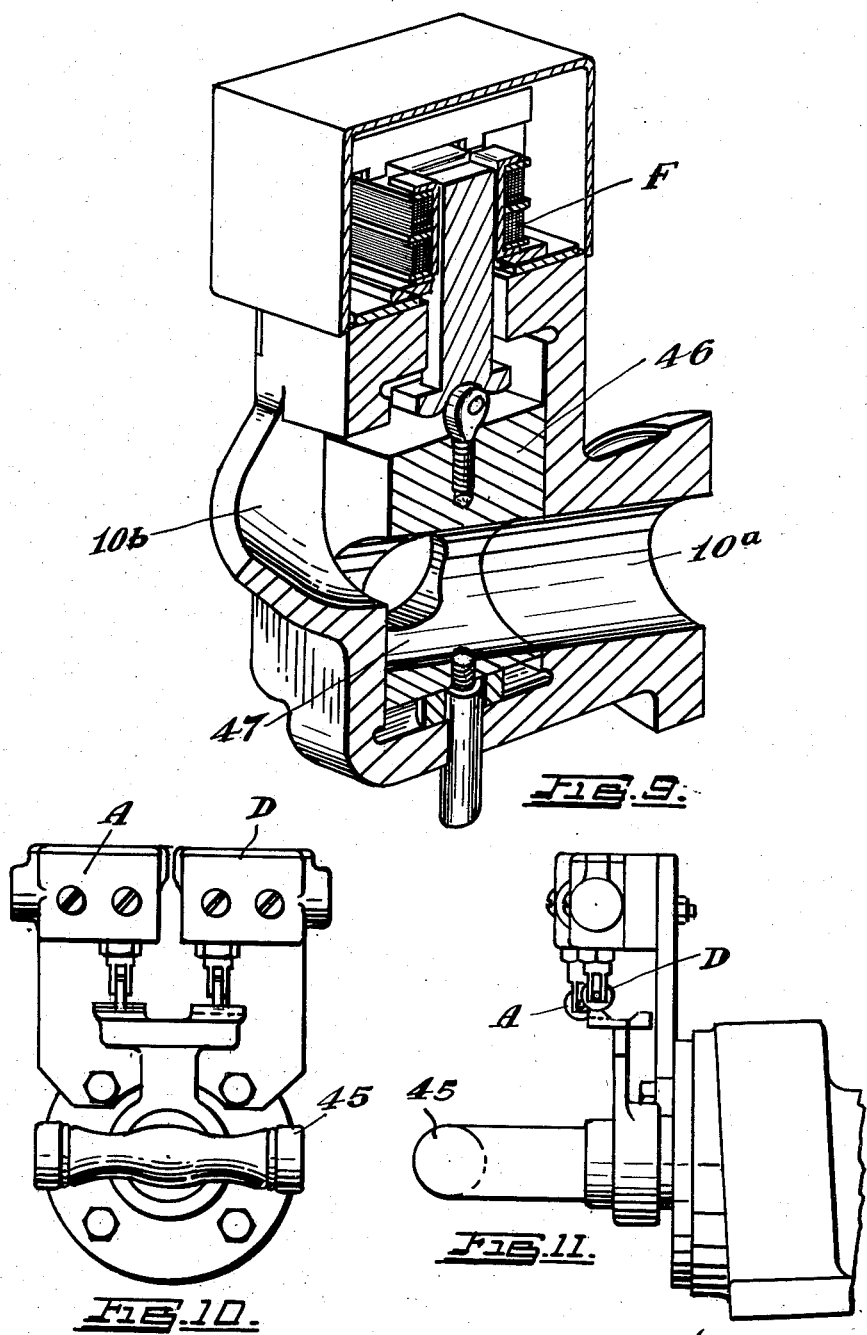

April 1, 1958     D. W. GINNS     2,828,875
REMOTE HANDLING ARRANGEMENTS
Filed Nov. 25, 1955     9 Sheets-Sheet 8
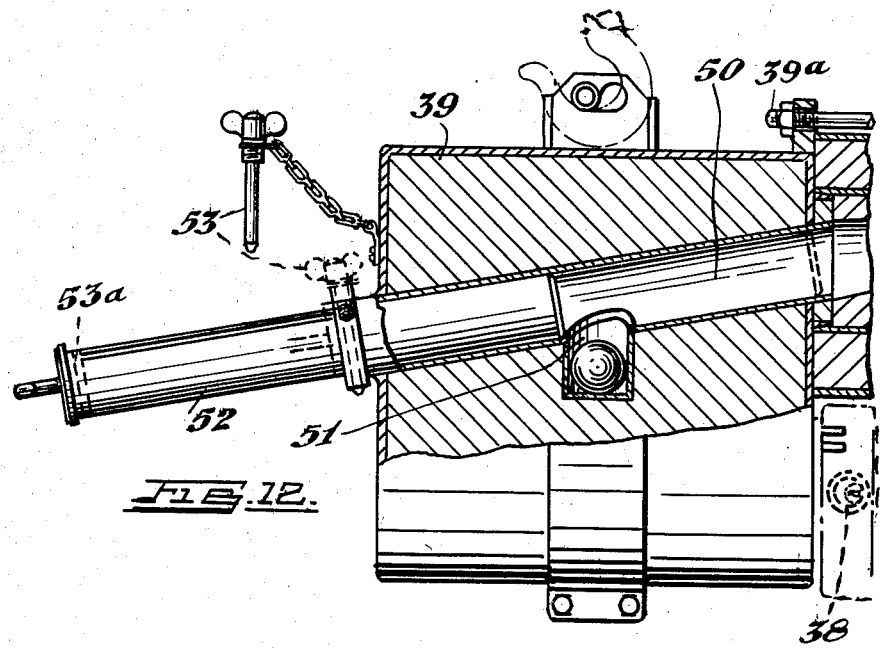
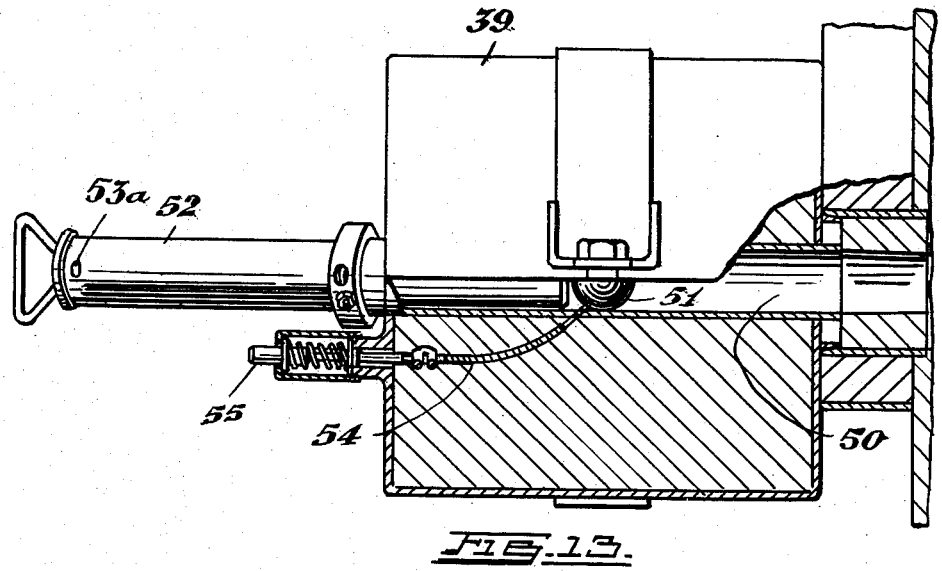
INVENTOR
DENNIS W. GINNS
By Robert B. Lieu
ATTORNEYS.

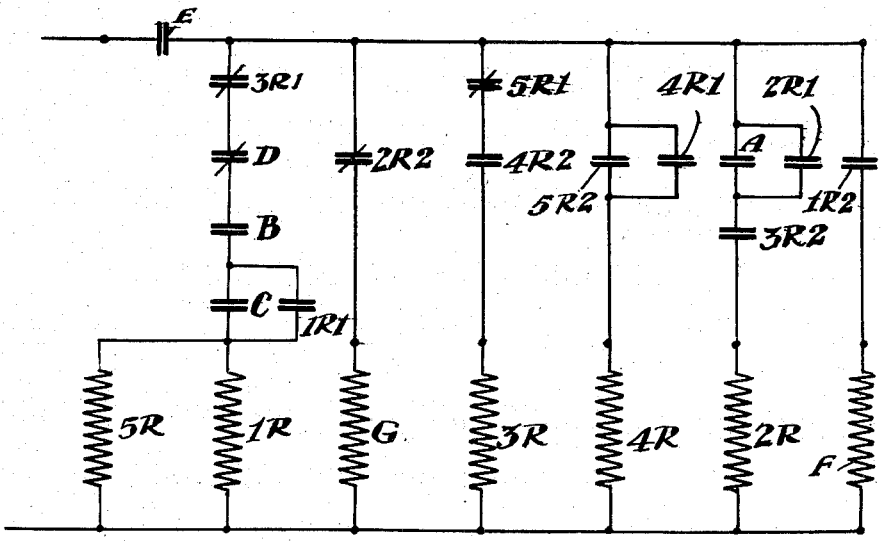
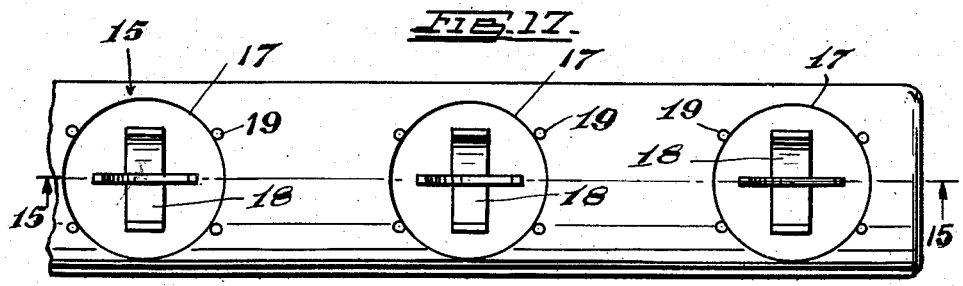
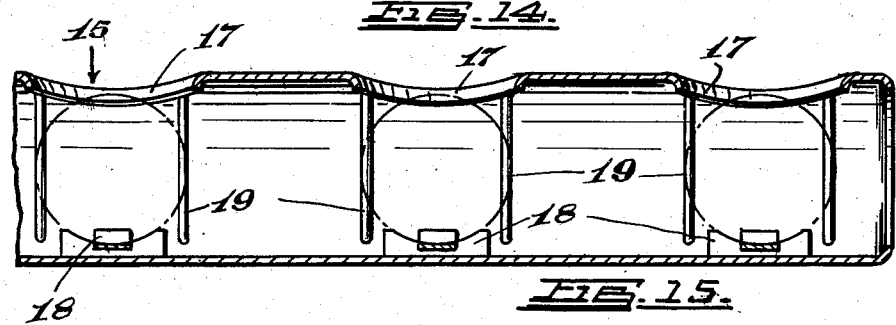
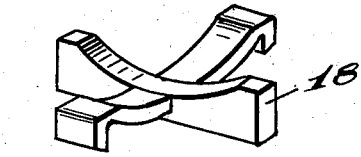

United States Patent Office 2,828,875
Patented Apr. 1, 1958

2,828,875
REMOTE HANDLING ARRANGEMENTS

Dennis William Ginns, Welwyn Garden City, England, assignor, by mesne assignments, to the United States of America as represented by the United States Atomic Energy Commission Application November 25, 1955, Serial No. 549,204

8 Claims. (Cl. 214—26)

This invention is a continuation-in-part of the invention disclosed in application Serial No. 128,705, filed November 22, 1949, now abandoned, and relates to an arrangement for the irradiation of samples with energy from an atomic pile or other source of intense nuclear radiation from which an operator is required to be shielded by a wall of substantial thickness, such as a concrete wall eight feet thick.

It is desirable to test the effect of radiation of different intensities on different materials. For this purpose it is necessary to expose the samples of material somewhere in the interior of the thick wall at a predetermined distance from the source. A sample which has been so exposed may be highly radioactive and must, therefore, be handled with extreme care to avoid injury to the operators.

Prior proposals for the irradiation of samples involved the provision of passages through the outer wall towards the source and sample-carrying devices adapted to be inserted into these passages. Withdrawal of the carrying devices had to be effected into lead-lined boxes of a length corresponding to the length of the passages and weighing several tons, and it was difficult to make the necessary arrangements for preventing dangerous radiation through the passages as the latter had to be straight. None of the prior proposed arrangements were, for these reasons, satisfactory.

According to the present invention an irradiation arrangement is provided which effectively eliminates all the hazards of the prior arrangements and involves the minimum of heavy, clumsy equipment for the handling of irradiated samples. The invention is based on the idea of irradiating the samples in the form of rolling bodies, preferably spherical pellets, and the usual way of putting this idea in practice is to enclose each sample in a hollow sphere of a material such, for example, as aluminium, having a low absorption cross sction.

In its broadest aspect the invention is embodied in a radiation absorbing shield including a massive wall having curved passageways inclined to the horizontal and traversing it for the gravity feed of individual rolling bodies from an outer operating face to an inner radioactive face and back to the outer operating face; detents are provided in the passageways for these bodies and are arranged to be manipulated from the outer face.

More specifically, the nature of the arrangement according to the invention is as follows: an inlet passageway extends from the outer operating face to the interior of the massive outer wall and slopes downwards from its outer end. The point in the interior to which the passageway extends is not critical, though it is advantageously the greatest distance from the source at which the exposure of any sample is likely to be desired. From the interior an outlet passageway extends to the outer face of the outer wall and slopes downwards from its inner end. Both of the passageways are tortuous in plan, and the slope of each is such that a pellet introduced at the upper end will pass to the lower end if the passageway is unobstructed. Extending from the outer face of the outer wall towards the source between the inlet and outlet passageways is a straight bore with which both passageways communicate at their inner ends, and in the bore is a longitudinally moveable plug provided with receptacles for pellets. Means are provided for controlling the passage of pellets through the inlet passageway into the receptacle so as to prevent a pellet from reaching the receptacle unless it is empty, and for releasing pellets from the receptacle into the outlet passageway.

The plug is preferably rotatable in the bore and has the receptacle formed in one side of it. In order to release pellets, the plug is rotated from a receiving position in which the receptacle registers with the inlet passageway to a release position in which the receptacle registers with the outlet passageway. The plug is preferably provided with a number of longitudinally separated pellet receptacles, the openings of which are aligned longitudinally of the plug, so that a number of pellets may be subjected simultaneously to irradiation of differing intensity. Means are provided for locking the plug in a position such that one of its receptacles registers with the inner ends of the passageways, and there are also means to prevent further longitudinal movement of the plug after it has been so locked until it has been rotated from a receiving position to a release position and back to a receiving position.

The invention will be described in more detail by reference to the form of arrangement illustrated in the attached drawings, in which the source of atomic energy is an atomic pile such as the pile described in co-pending patent application Serial No. 276,604, filed March 14, 1952, now Patent No. 2,807,580, dated September 24, 1957, or the Canadian atomic pile known as the NRX reactor situated at Chalk River, Ontario. Descriptions of the NRX reactor have appeared in the following publications: Electrical Engineering, June 1951, p. 476; The Engineering Journal, October 1953, p. 1269; Chemical Engineering Progress, vol. 50, 1954, p. 267; Geneva Conference 1955, papers 5 and 6.

In the drawings—

Figure 4 is a detail view of one of the obstructions shown near the end of each inlet passageway in Figure 2;

Figure 4A is a view along the line 4A—4A of Figure 4;

Figure 6 is an enlarged detail sectional view of the plug-operating mechanism and a portion of the plug casing corresponding to the showing of the centre plug in Figure 2 and being taken thus, so far as the plug-operating mechanism is concerned, along the line 6—6 of Figure 5;

Figure 7 is a section along the line 7—7 of Figure 5;

Figure 8 is a section along the line 8—8 of Figure 7;

Figure 9 is a sectional perspective view of the gate in the inlet passageway and the mechanism for operating it;

Figure 10 is a front view, looking towards the outer face of the outer wall, of the handle for the obstruction in the inner end of the inlet passageway, showing the switches operated by this handle;

Figure 11 is a side view of the handle and switches shown in Figure 10;

Figure 12 is a part sectional elevation of a flask for receiving an irradiated sample, the flask being in position in relation to the outer end of the outlet passageway;

Figure 13 is a part sectional plan view of the flask shown in Figure 12;

Figure 14 is a plan view of the inner end of the plug showing the arrangement of the receptacles therein;

Figure 15 is a cross section on the line 15—15 of Figure 14;

Figure 16 is an enlarged perspective view of a pellet supporting cradle which is arranged in each receptacle; and Figure 17 is a diagram of the electrical circuit controlling the operation of the various parts of the arrangement.

Figure 1:
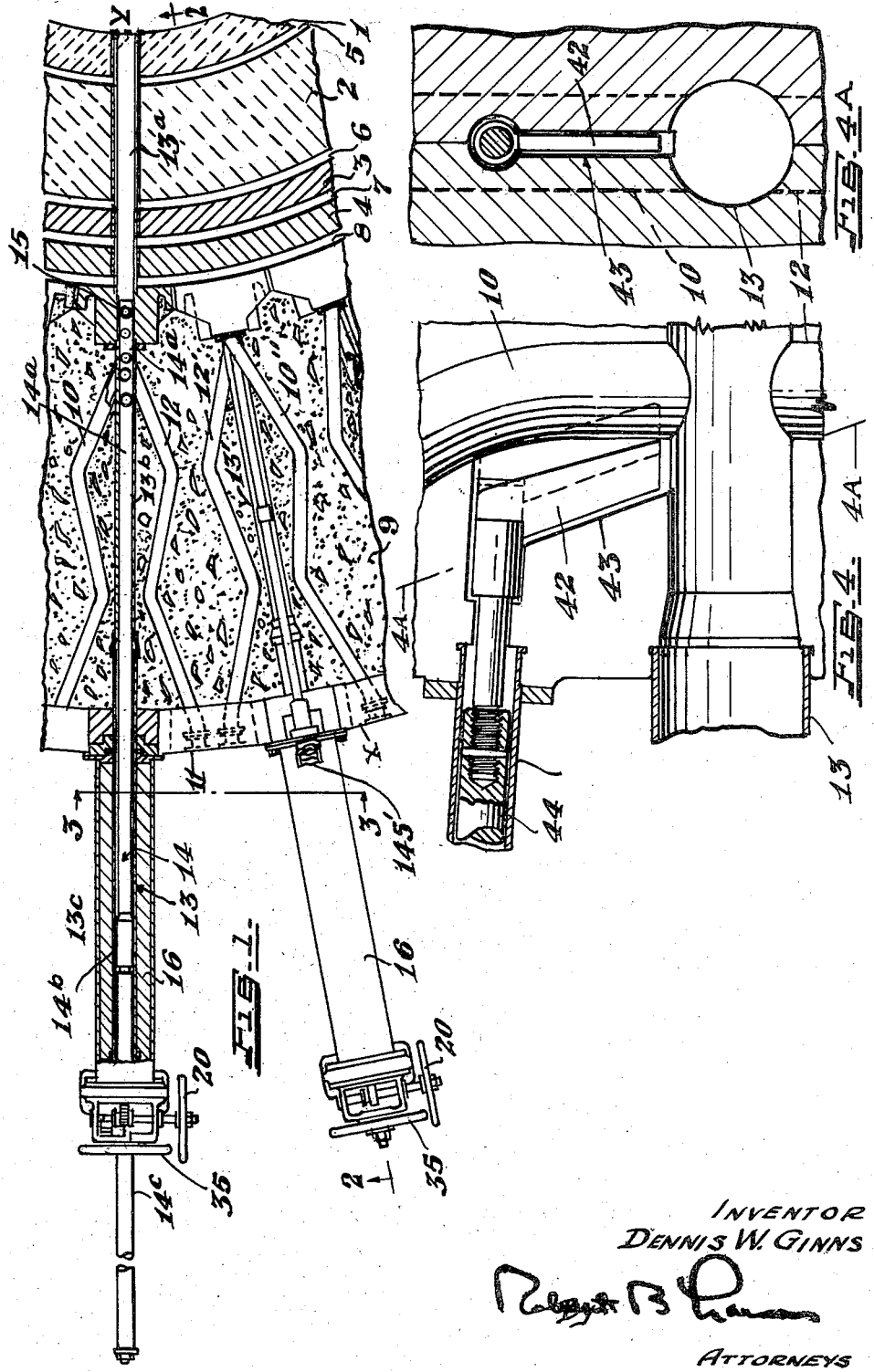
Figure 1 is a part sectional general plan view of the arrangement, showing the general relation of the passageways and bore to the pile as a whole, the view being taken along the line 1—1 of Figure 2.
Figure 2:
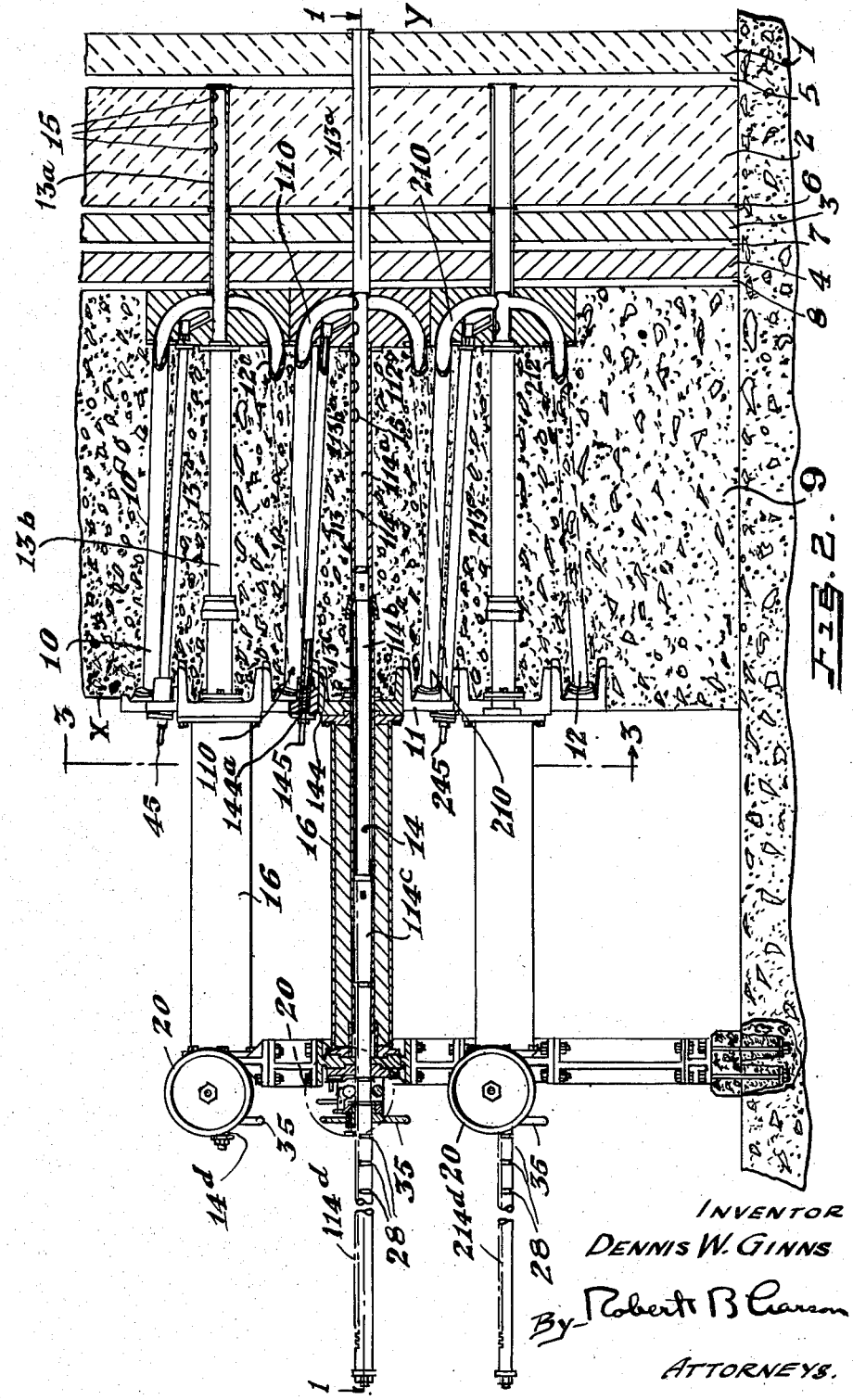
Figure 2 is a partial vertical section taken along the line 2—2 of Figure 1.
Figure 3:
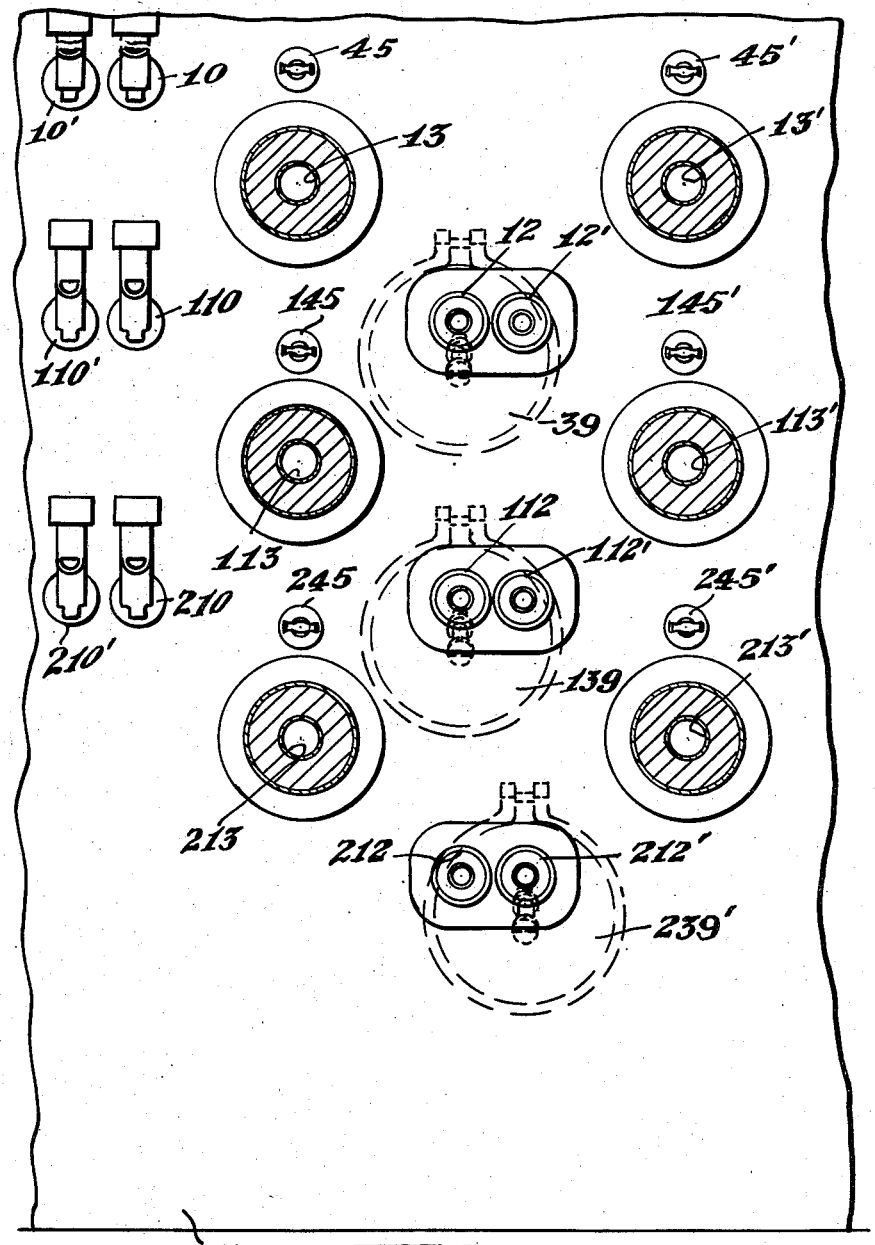
Figure 3 is a partial elevation of the outer face of the outer wall of the pile, certain parts being shown in section as indicated by the line 3—3 of Figure 1.

The arrangement of the invention is shown generally in Figures 1 and 2, which illustrate also the relation of its various parts to the core and outer wall of the pile. Figures 1 and 2 show only fragments of the outer wall X which surrounds the core Y of the pile. The particular formation of the outer wall is not of significance in connection with the invention. As shown, the portion of the wall nearest the core is composed of layers 1 and 2 of graphite and layers 3 and 4 of steel, the layers being separated by air spaces 5, 6 and 7. Beyond the outer face of the steel layer 4 is an air space 8, and the remainder of the wall outside this air space is a thick layer 9 of concrete. It is in this layer 9 that the pellet irradiation arrangements are formed. Two are shown side by side in Figure 1 and three one above the other in Figure 2. Any suitable number may be provided in the relation to each other as indicated in Figures 1, 2 and 3.

Each arrangement comprises an inlet passageway 10 extending from the outer face 11 of the outer wall X to the interior of that wall and terminating near the inner face of the concrete layer 9. Each inlet passageway is tortuous in plan, as shown in Figure 1, and slopes downwards from its outer end as shown in Figure 2. An outlet passageway 12 is also provided, the inner end of which is immediately below the inner end of the passageway 10 and which, like that passageway, is tortuous in plan but slopes downwards from its inner end to its outer end at the outer face 11 of the wall X. The slope of each passageway is such that a pellet introduced at its upper end will pass to the lower end if the passageway is unobstructed.

Extending from the outer face of the wall X towards the core Y, between the inlet and outlet passageways 10 and 12, is a straight bore 13 with which the passageways 10 and 12 communicate at their inner ends. A plug 14, which is provided with a number of pellet receptacles 15, normally three or five, is rotatable and longitudinally movable in the bore.

In order to prevent the escape of neutrons through the bore, both the bore and the plug have three portions of different diameter with the portion of greatest diameter at the outer end. The inner portion 13a of the bore extending through the walls 1—8 is of smallest diameter, the middle portion 13b extending from the inner ends of the passageways 10 and 12 to a point short of the outer face of the wall X is of intermediate diameter, and the outer portion 13c is of greatest diameter. This portion 13c extends out beyond the outer face of the wall X through a thick lead sheath 16. The inner portion 14a of the plug is of a diameter such that it just fits into the portion 13a of the bore, the middle portion 14b is of a diameter such that it just fits into the portion 13b of the bore, and the outer portion 14c is of a diameter such that it just fits into the portion 13c of the bore. There are thus two obstructions to the passage of neutrons through the bore, one in the form of a shoulder at the junction of portions 14a and 14b of the plug and the other in the form of a shoulder at the junctions of the portions 14b and 14c.

The formation of the receptacles 15 is shown in detail in Figures 14, 15 and 16. The plug is hollow at its inner end and is provided with openings 17 large enough to permit the passage of a pellet. The pellet falls through the opening 17 onto a cradle 18 of the form shown in detail in Figure 16 and is held in the cradle by four posts 19 attached to the plug around the opening 17. The cradles 18 permit circulation of air all around each pellet and thus enable adequate cooling of pellets which are being subjected to neutron bombardment.

Figures 5–8 show in detail the plug-operating mechanism by means of which the plug may be rotated and may be moved longitudinally from a position such, for example, as that in which it is shown at the top of Figure 2 to a position such as that in which it is shown in the middle of Figure 2.

Longitudinal movement is effected by the hand wheel 20 (Figure 5) which turns a shaft 21 carrying a pinion 22 which may engage a rack 23 formed on a reduced diameter extension 14d of the plug. The pinion 22 is keyed to the shaft 21 but may be moved lengthwise of the latter by means of a fork 24 extending from a member 25 which may be moved along a rod 26 by the handle 27.

In the plug extension 14d is formed a number of arcuate grooves 28 extending wholly around the extension 14d except for that part in which the rack is formed. The spacing and number of the grooves is the same as the spacing and number of the receptacles 15. These grooves are adapted to be engaged by a locating key 29 which is normally pressed towards the plug by the post 30 under control of the spring 31, but may be held away from the plug by pulling the handle 32 to the right in Figure 7 or out of the plane of the paper in Figure 6. This swings a lever 33 on its pivot 34 and withdraws the locating key by moving it to the left in Figure 7 against the pressure of the spring 31, so that the plug can move freely past it. When the locating key is thus withdrawn, the lever 33 engages behind the right angled shoulder 60 of the spring 61, so that the key remains withdrawn until it is manually released. The position of the grooves in the extension 14d is such that when the locating key engages in a certain groove, then the receptacle corresponding with that groove is aligned with the inner ends of the passageways 10 and 12. Longitudinal movement of the plug is prevented by a latch 36 which can be released only by the insertion in the lock 37 of a key which is normally in a lock 38 shown in dotted lines on Figure 12 and can be released therefrom only when the receptacle 39 for receiving treated pellets, which will be more fully described hereafter, has been put in position at the end of the outlet passageway. So long as the key is not in the lock 38 the receptacle cannot be removed. A system of this kind which has been used with satisfaction is that known as the Bendix-Cory interlock system.

When the pinion 22 has been moved by the handle 27 out of engagement with the rack 23, rotation of the plug is effected manually through the wheel 35. The two positions in which the plug may be left at rest are 180° from each other, and a spring-controlled locating catch 40 on the wheel 35 adapted to enter one of two holes 41 holds the plug firmly in the appropriate circumferential position.

As shown in Figures 4 and 4A, near the inner end of the inlet passageway 10 is an obstruction 42 which, when in position, prevents the passage of a pellet into a receptacle 15. The obstruction is connected by an operating rod 44 to a handle 45 on the outer face of the wall X, and a spring, not shown in connection with the rod 44 but shown at 144A in Figure 2 in connection with the rod 144, acts on the rod to hold the obstruction normally in the passageway. It may, however, be withdrawn into the chamber 43 by pulling the handle 45 against the action of the spring.

The outer end of the inlet passageway is fitted with the gate mechanism in Figure 9 which mechanism has an inner portion 10a and an outer portion 10b which are out of registry with each other. At the junction of these portions is a moveable gate 46 which has a bore 47 through which a pellet can pass, but long enough to take only one pellet at a time. In the position in which the gate is shown in Figure 9 the bore 47 is in a registry with the inner portion 10a of the inlet passage. The gate may, however, be raised to bring the bore 47 into registry with the outer portion 10b of the passage. Movements of the gate are under control of a solenoid F, the gate being in the position shown in Figure 9 when the solenoid is de-energized and in registry with the outer portion 10b when the solenoid is energized. As shown, the outer portion 10b is extremely short and really constitutes a funnel. It will be clear, however, that the gate mechanism might, if desired, be arranged further in from the outer end of the passageway.

Figure 3 shows a preferred arrangement of a number of devices of the kind just described. The outer ends of the inlet passageways are arranged in three pairs one above the other as shown at 10, 10', 110, 110', 210 and 210'. The straight bores for the plugs containing the receptacle to which pellets from passages 10, 110 and 210 are fed are shown at 13, 113 and 213, and the handles controlling the operation of the obstructions for the passageways 10, 110, and 210 at 45, 145 and 245, the switches operated upon most of these handles being omitted for purposes of clarity. The outer ends of the outlet passageways are also arranged in pairs as shown at 12, 12', 112, 112', 212 and 212', the straight bores for the plugs from which pellets are fed into the outlet passageways 12', 112' and 212' being shown at 13', 113' and 213'. Beyond these and on the same level as the outer ends of the passageways 10, 110 and 210 would be the outer ends of a further set of inlet passageways (one of which is shown at 10" in Figure 1) for feeding the receptacles in the plugs in the bores 13', 113' and 213'. The handles controlling the operation of the obstructions in these inlet passageways are shown at 45', 145' and 245'. Flasks for receiving the treated pellets at the outer ends of the outlet passageways are shown in dotted lines at 39, 139 and 239', flasks 39 and 139 being in position over the outlet passageways 12 and 112, and flask 239' in position over the outlet passageway 212'.

The operation of the pellet irradiating arrangement described is as follows, the numbers at the beginning of certain paragraphs indicating the sequence of steps to be performed by the operator.

(1) The pellet-receiving flask 39 is mounted in position over the outer end of the outlet passageway and held there by the bolts 39a and the hook shown in dotted lines in Figure 12 and attached, for instance, to a crane. When it has been mounted, the plug 52 is pulled out to the position shown in Figures 12 and 13. The proper mounting of the flask releases the key from the lock 38 and removal of this key locks it in place (Figure 12). There is a separate flask for each outlet passageway, and the key which is released when a flask is put in position will unlock only the plug associated with the outlet passageway on which the flask is mounted.

(2) The latch 36 is released by unlocking the lock 37 with the key taken from the lock 38. This frees the plug 14 for longitudinal movement which may be effected by turning the hand wheel 20.

(3) The locating key handle 32 is pulled to the right in Figure 7 to move the locating key out of contact with the extension 14d of the plug 14, and, while the key is out of contact, the hand wheel 35 is rotated to withdraw the plug until the desired groove 28 registers with the locating key and thus the desired receptacle 15 registers with the inner ends of the passageways 10 and 12. The locating key handle 32 is then released with the result that the locating key 29 enters the appropriate groove 28, and the switch is closed by reason of the outward movement of the rod 30 under the influence of the spring 31.

The position of the switch E in the electrical circuit is shown in Figure 17, in which all the contacts are shown in the condition in which they are at the beginning of the sequence of operations now being described. As will be seen from this figure, the closing of the switch E energizes the solenoid G since the contact 2R2 is normally closed. The mechanical position of this solenoid is shown in Figures 7 and 8. Its energization causes a catch 48 to be projected out through an opening in a lug 49 extending from the locating key and aligned with the catch 48 when the locating key is engaged in a groove 28. Thus the engagement of the locating key in a groove automatically locks it in position until the solenoid G is de-energized as a result of further operations as will appear from the following description. The catch 48 is shown in Figure 8 in its extended position and in Figure 7 in its withdrawn position, that is in the position it assumes when the solenoid G is de-energized.

Figure 5:
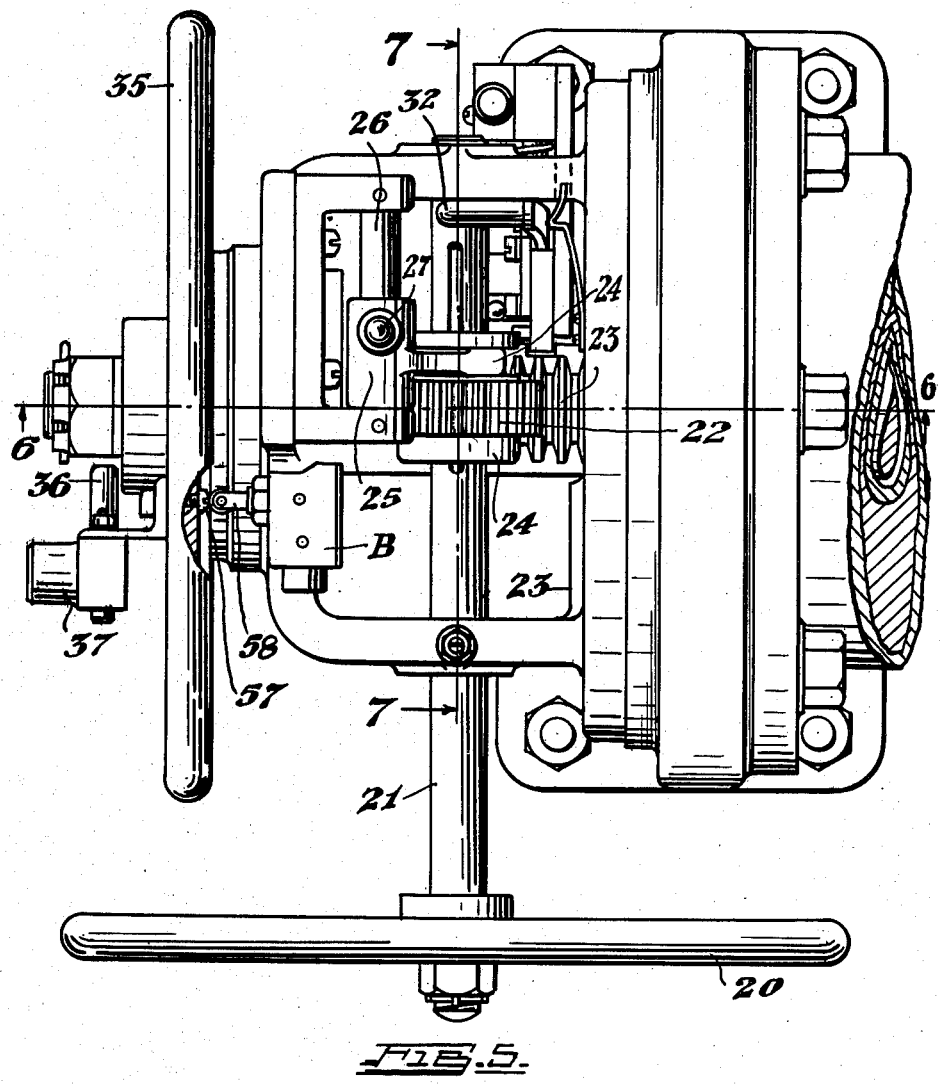
Figure 5 is an enlarged detail plan view of a plug-operating mechanism, two of which appear at the left hand side of Figure 1.

(4) The pinion 22 is moved out of engagement with the rack 23 by moving the handle 27 towards the top in Figure 5.

(5) A pellet to be irradiated is put in the outer portion 10b of the outer passageway. Since, as appears from Figure 17, the contact 1R2 is normally open, the solenoid F controlling the operation of the gate 46 is de-energized. The gate thus is aligned with the inner portion 10a of the inlet passageway 10 and the pellet therefore remains in the outer portion 10b.

(6) The locating catch 40 is pulled out and the hand wheel 35 is rotated clockwise through 180°, the locating catch 40 then entering the upper hole 41 and thus holding the plug in its new position. In this position the receptacles 15 are turned upside down with the result that any pellet which is in the receptacle at that time in registry with the inner end of the outlet passageway 12 falls into that passageway and passes down through it to the receiving flask 39, which has an opening 50 communicating with a chamber 51 into which the pellet falls. The opening 50 is controlled by a plug 52 which can be withdrawn to the position shown in Figures 12 and 13 and held there by a key 53, but is otherwise in the fully inserted position shown in dotted lines in Figure 12 where it holds a pellet in the chamber 51. A feeler cable 54 controlled by a push button 55 is provided for the purpose of determining whether or not a pellet is in the chamber 51. The entire receptacle 39 is of massive lead to prevent injurious radiation from the treated pellet.

It will be noted from Figures 5 and 6 that switches B and C are associated with the hand wheel 35. In the normal position of the plug 14, that is when the receptacles are upright, a projection 57 bears on the operating rod 58 of the switch B (see Figure 5) and holds it open. The switch C, on the other hand (Figure 6) is open when the projection 57 is not in engagement with it. Thus in the normal position of the plug the switch B is closed and the switch C open. However, when the plug has been rotated through 180° the projection 57 is no longer in contact with the operating rod 58 of the switch B, with the result that the latter is closed, but depresses the operating rod 59 of the switch C with the result that the latter is also closed.

It will be seen from Figure 17 that closing of the switches B and C energizes the relays 1R and 5R (the relay 3R1 and the switch D being already closed). Energization of the relay 1R closes the contact 1R1, thus locking the relays against the opening of the switch C. It also closes the contact 1R2 with the result that the solenoid F controlling the operation of the gate 46 is energized. The gate is thus lifted and the pellet in the outer portion 10b rolls into the bore 47 of the gate but goes no further because the gate is not then in line with the inner portion 10a of the passageway.

Energizing of the relay 5R opens the normally closed contact 5R1 and closes the contact 5R2. The closing of this latter contact energizes the relay 4R with the result that the contacts 4R1 and 4R2 are closed, the closing of the contact 4R1 locking the relay 4R against opening of the contact 5R2.

(7) The locating catch 40 is pulled out to permit rotation of the hand wheel 35, and the latter is rotated counter-clockwise to bring the plug to its normal position where the catch again engages in the lowermost hole 41. As soon as rotation of the hand wheel begins, the projection 57 passes out of contact with the operating rod 59 of the switch C and the latter opens but the relays 1R and 5R nevertheless remain energized because the contact 1R1 is closed. When, however, the plug reaches its normal position and the projection 57 again engages the operating rod 58 of the switch B, the latter is opened and the relay 1R and 5R are then de-energized, as will be seen from Figure 17.

De-energization of the relay 1R opens the contact 1R2 with the result that the solenoid F is de-energized, the gate 46 drops to the position shown in Figure 9 and the pellet in its bore rolls down the inlet passageway 10 until it meets the obstruction 42. De-energization of relay 5R allows the contact 5R1 to close with the result that relay 3R is energized, the contact 4R2 being already open owing to the fact that the relay 4R was previously energized and remains so through the contact 4R1 notwithstanding the opening of the contact 5R2. Energization of the relay 3R opens the contact 3R1 and closes the contact 3R2. The opening of the contact 3R1 prevents further energization of the relays 1R and 5R, even if the hand wheel 35 were again rotated, until certain further operations described below have been carried out. If this were not prevented the result of again rotating the plug to its pellet release position and back again to its normal position would be to release a further pellet into the inlet passageway (if one were inserted in the outer section 10b) so that there would be two pellets in the passageway behind the obstruction 42.

(8) The handle 45 is pulled fully out, thus withdrawing the obstruction 42 into the chamber 43 and allowing the pellet in the inlet passageway to fall into the receptacle which registers with that passageway. The pulling out of the handle 45 opens the switch D and closes the switch A, as can be seen from Figure 11. The closing of the switch A energizes the relay 2R (the contact 3R2 being already closed) with the result that the contact 2R1 is closed, locking the relay against opening of the switch A, and the normally closed contact 2R2 opens, thus de-energizing the solenoid G and releasing the locating key 29 so that it can be pulled out of engagement with the groove 28 to permit further longitudinal movement of the plug 14.

(9) The handle 45 is released, thus opening the switch A and closing the switch D.

(10) The pinion 22 is re-engaged with the rack 23.

(11) The locating key handle 32 is pulled to disengage the locating key 29 from the groove 28, and as a result the switch E opens, de-energizing the whole circuit, as appears from Figure 17, and thus returning all the switches and contacts to the condition shown in that figure.

In order to load other receptacles 15 with pellets to be treated, the operations described above under Nos. 3–11 are repeated with the locating key 29 engaging in each case a different appropriate groove 28. When the desired receptacles have been loaded, the plug is moved to its full in position, as shown at the top of Figure 1 and in Figure 6, the locating key being held out of contact with the plug during this operation.

From the preceding description of the operation of the pellet irradiating arrangement, it will be seen that it is impossible for a pellet to enter a receptacle until it is empty, because the step of bringing the plug to a pellet release position (step 6 above), i. e. turning the receptacle upside down so that any pellet in it falls out into the outlet passageway, must take place before a pellet can enter the gate, and then the receptacle (now empty) must be brought back to receiving position (step 7) before the pellet can roll from the gate into the inner portion of the passageway. The plug cannot be moved longitudinally during these steps and so prevents any other receptacle from registering with the outlet passageway when it is turned upside down, because it is locked against longitudinal movement by the engagement of the locating key 29 in a groove 28.

The arrangement according to the invention offers considerable flexibility in use since one or each of the receptacles in a given plug may be filled with a pellet and any receptacle may be easily emptied without emptying the others, whereas this was impossible with prior arrangements. Thus with the arrangement of the present invention it is possible, for instance, to subject one pellet to intense irradiation for a long time and yet to subject other pellets to less intense irradiation for shorter times in the same plug, or vice versa.

Since, once a pile has been in operation, it cannot be dismantled for repairs to the interior because of the intense radioactivity of all the interior parts, it is of the highest importance that anything which has to extend into the interior should be of such simple and rugged construction that it cannot possibly get out of order. The arrangement of the present invention fulfils this requirement in that the only moving parts subject to irradiation are the inner ends of the plugs and the obstructions in the inlet passageways, neither of which are subject to any strain or wear as a result of which they could fail to operate. All the operating mechanism for the arrangement is outside the pile where it is easily accessible for repair and not subject to irradiation.

The invention has been described in relation to an atomic pile by way of example only. The source of radiations may be any other source requiring massive shielding such as Cobalt 60 or gamma emitting fission products of an atomic pile.

I claim:

1. An arrangement for the irradiation of samples in spherical pellet form, said arrangement comprising an inlet tube extending from the outer face to the interior of a massive shielding wall and sloping downwards from its outer end, an outlet tube extending from the interior of said wall to the outer face of the latter and sloping downwards from its inner end, both said tubes being tortuous in plan and the slope of each being such that a pellet introduced at the upper end will pass to the lower end, if the tube is unobstructed, a straight bore extending from the said face of the said wall between said inlet and outlet tubes, said bore communicating with both said tubes at their inner ends, a rotatable and longitudinally movable plug in said bore, a receptacle in said plug for pellets, means for controlling the movement of pellets through the inlet passageway into said receptacle and operable to permit passage of a pellet to the receptacle only when the receptacle is empty, and means for releasing pellets from said receptacle into the outlet tube.

2. An arrangement as defined in claim 1, in which the plug is rotatable in the bore and the receptacle is formed in one side of said plug, and in which the means for releasing pellets into the outlet tube comprise means for rotating the plug from a receiving position in which the receptacle registers with the inlet tube to a release position in which it registers with the outlet tube.

3. An arrangement as defined in claim 1, in which the inlet tube has an outer and an inner portion which are out of registry with each other said pellet controlling means comprising a movable gate at the junction of said portions, said gate having a bore long enough to contain only one pellet at a time and through which a pellet can pass, means for keeping the bore in said gate in registry with said inner portion while the receptacle in the plug is in pellet receiving position and means associated with the pellet release means for bringing the bore in said gate into registery with said outer portion when said pellet release means are operated.

4. An arrangement as defined in claim 3, and a movable obstruction in the inlet tube adapted when in blocking position to prevent the passage of a pellet to the receptacle in the plug, and means coordinating the operation of the last mentioned means of claim 3 with movement of said obstruction so as to ensure that said bore is brought into registry with the outer portion of the tube only when said obstruction is in blocking position.

5. An arrangement as defined in claim 2, in which the inlet tube has an outer and an inner portion which are out of registry with each other, said pellet movement controlling means comprising a movable gate at the junction of said portions, said gate having a bore long enough to contain only one pellet at a time and through which a pellet can pass, means for keeping the bore in said gate in registry with said inner portion while the receptacle in the plug registers with the inlet tube, and means for moving said gate to bring said bore into registry with said outer portion when said receptacle registers with the outlet tube.

6. An arrangement as defined in claim 5, a movable obstruction in the inlet tube below said inner portion adapted when in blocking position to block passage of a pellet to the receptacle in the plug, said means for moving said gate comprising a solenoid operably connected to said gate, means for energizing said solenoid to move said gate to a position in which the bore is in registry with the outer portion, in which position the bore can receive a new pellet, and means coordinating the energization of said solenoid with the movement of said obstruction so as to assure that said solenoid is energized only when said obstruction has been moved to release a pellet and returned to blocking position, thereby permitting the presence of only one pellet at a time in said tube between said obstruction and said inner portion.

7. An arrangement as defined in claim 1, in which the plug is provided with a number of longitudinally separated receptacles for pellets, the openings of said receptacles being aligned longitudinally of the plug.

8. An arrangement as defined in claim 7, comprising means for locking the plug in a position such that a receptacle therein registers with the inner ends of the tubes, and means for preventing further longitudinal movement of the plug after it has been so locked until it has been rotated from a receiving position to a release position and back to a receiving position.

No references cited.